United States Patent
Coupe

[11] Patent Number: 5,279,212
[45] Date of Patent: Jan. 18, 1994

[54] APPARATUS FOR THE STEAM-COOKING OF FOODSTUFFS

[75] Inventor: James G. M. Coupe, Wissous, France

[73] Assignee: Gether S.A., Wissous, France

[21] Appl. No.: 851,966

[22] Filed: Mar. 16, 1992

[30] Foreign Application Priority Data

Mar. 22, 1991 [FR] France ................. 91 03494

[51] Int. Cl.⁵ .................................... A23L 3/10
[52] U.S. Cl. ............................. 99/330; 99/370;
        99/470; 99/355
[58] Field of Search ............... 99/330, 331, 403, 448,
        99/476, 470, 483, 368, 370, 357; 62/64, 85, 373,
        384, 475; 126/369.2; 426/510, 523, 524

[56] References Cited

U.S. PATENT DOCUMENTS

| | | | |
|---|---|---|---|
| 1,518,552 | 12/1924 | Babendreer | 99/370 |
| 2,372,239 | 3/1945 | Whitaker et al. | 99/370 |
| 2,472,970 | 6/1949 | Hanna | 99/370 |
| 3,590,841 | 7/1971 | Reimers | 99/370 |
| 3,753,737 | 8/1973 | Latham et al. | 99/373 |
| 3,835,762 | 9/1974 | Rambaud | 99/483 |
| 4,157,061 | 6/1979 | Margus, Jr. | 99/371 |
| 4,164,590 | 8/1979 | Mencacci | 99/470 |
| 4,187,325 | 2/1980 | Turee, Jr. | 99/357 |
| 4,350,086 | 9/1982 | Wetzel | 99/368 |
| 4,439,459 | 3/1984 | Swartley | 99/330 |
| 4,729,775 | 3/1988 | Patte et al. | 55/241 |

FOREIGN PATENT DOCUMENTS

2625891 7/1989 France .
2635167 2/1990 France .

Primary Examiner—Harvey C. Hornsby
Assistant Examiner—James F. Hook
Attorney, Agent, or Firm—Foley & Lardner

[57] ABSTRACT

A device for steam cooking foodstuffs having a steam producer with an outlet to provide steam to a sealed vessel containing foodstuffs and provided with an apparatus to control the pressure in the vessel. The pressure in the vessel is controlled by condensing the steam in the vessel by a sheet of cold fluid drawn down along the inner wall of the vessel.

4 Claims, 2 Drawing Sheets

APPARATUS FOR THE STEAM-COOKING OF FOODSTUFFS

FIELD OF THE INVENTION

The invention generally relates to an apparatus for the steam-cooking of foodstuffs. It more particularly relates to an apparatus for cooking foodstuffs by means of steam an an industrial scale, while preferably using a mean temperature, i.e. especially a temperature lower than 100° C., and preferably about 70° C.

BACKGROUND OF THE INVENTION

In the foodstuff field, there is a constantly increasing demand for cooked or pre-cooked foodstuffs which are proposed to consumers as frozen or non-frozen products. The foodstuffs thus prepared may be packaged in sealed bags, under vacuum, or in boxes. Thus, the cooking of the products may be advantageously carried out after the packaging thereof.

Furthermore, recent studies have enabled the optimal cooking steps for each kind of foodstuff to be defined, on purpose to keep the nutritional and gustative properties thereof, while insuring a long shelf life after their cooking.

Related studies have shown that the temperature rising, the cooling after cooking, and the stability of the proper cooking temperature were the important parameters characterizing the products. These parameters have to be precisely controlled during the whole cooking period and with regards to the proper cooking volume. Accordingly, the cooking temperature must be adjusted or stabilized to a precise level (preferably to the nearest degree) in all parts of the cooking vessel, this optimal temperature often being lower than 100° C., especially about 70° C.

Thus, various cooking processes have been tested, wherein baskets containing foodstuffs were sprayed with hot water at any suitable temperature. Use was also made of water-bath devices. These attempts revealed problems relating to the control of the cooking temperature and to the modifications of the temperature.

Moreover, steam cooking has many advantages, especially with regard to the dietetics, when the foodstuffs have been cooked in bulk and not as a sealed packaging. However, until recently, it was difficult and even impossible to adjust the steam cooking temperature at a temperature lower than 100° C.

In FR-A- 2 625 891, there is described a device for the steam cooking of foodstuffs. This device is remarkable in that steam is gradually injected into the cooking vessel and the temperature is adjusted by controlling the pressure within said vessel. The invention relates to an improved apparatus of the above-mentioned type, which is especially intended to enable the temperature to be more efficiently controlled and the uniformity of the temperature to be improved in the useful space of the vessel.

SUMMARY OF THE INVENTION

Having the foregoing in mind, it is an object of the invention to provide an apparatus for steam cooking foodstuffs comprising:
means for producing steam;
a sealed vessel containing said foodstuffs;
a steam outlet in said steam producing means being connected to said sealed vessel, and
means for controlling the pressure which is prevailing in said vessel;
said pressure control means comprising means for condensing the steam contained in said vessel;
said steam condensing means comprising means for generating the drawing down of a cold fluid in sheets onto the inner wall of said vessel,
said sheet drawing off means being connected to a cold fluide source.

Such an arrangement enables the desired operation pressure (for example the temperature) to be efficiently controlled by condensing the steam while cooling the vessel wall, thus avoiding any restitution of energy, especially when the cooking is initiated, that could alter the uniformity of the steam temperature within the vessel. In other words. When the water is drawn down in sheets, it is possible to control two distinct parameters, i.e. the condensation of the steam within the vessel and the uniformity of the cooking temperature in the whole inner space of the vessel. Furthermore, upon completion of the foodstuff cooking, the embodiment of the invention enables a first cooling of the foodstuffs.

According to the previous statement, the pressure value has to be considered as a gauge pressure, i.e. the relative pressure may be higher or (preferably) lower than the atmospheric pressure. Thus, steam is produced, which is gradually injected into the vessel as desired, and this enables the temperature within the vessel to be controlled while adjusting the pressure within the vessel, especially by controlling the steam condensation. Should the pressure be raised above the atmospheric pressure, this would provide a cooking at a temperature higher than 100° C. On the contrary, when the cooking is carried out at 70° C., there is no problem, since it is sufficient to apply depression (with respect to the atmospheric pressure) in the vessel and to control the negative pressure (depression). In other words, it is sufficient to generate and control a depression (with respect to the atmospheric pressure in said vessel) on purpose to maintain a selected temperature lower than 100° C.

Provision is made for various other kinds of means intended to control the pressure prevailing within the vessel. They are intended to control the boiling water temperature in the steam generator, the steam flow rate between the generator and the sealed vessel, and the drawing off of the condensate in the lower part of the vessel.

The invention also relates to cryogenic cooling means to be used after the cooking phase.

SHORT DESCRIPTION OF THE DRAWINGS

Other features and advantages of the invention will become apparent from the following description, with reference being made to the accompanying drawings, wherein.

DESCRIPTION OF THE INVENTION

Figure 1:
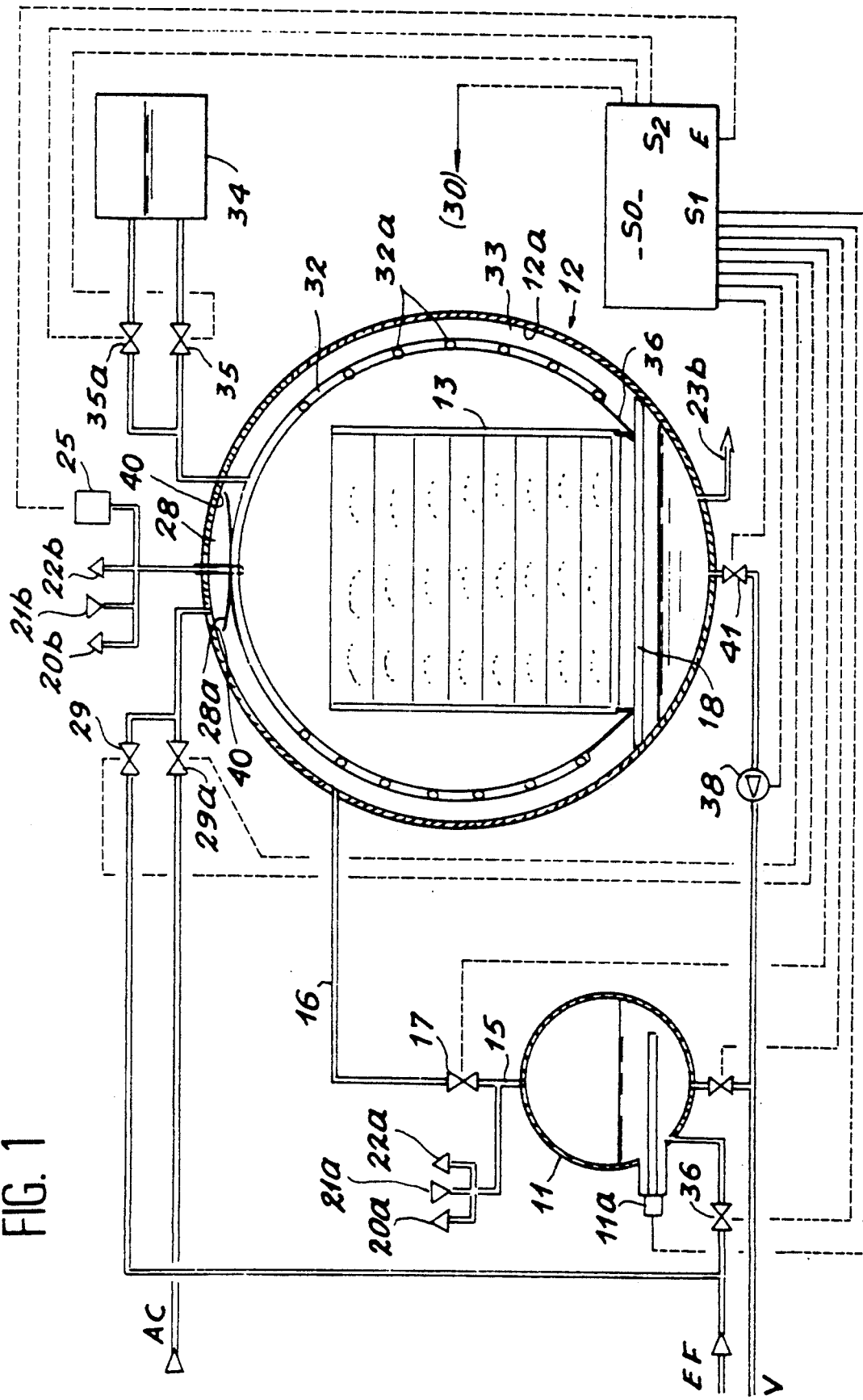
FIG. 1 is a schematic view illustrating the features of the invention.
Figure 2:
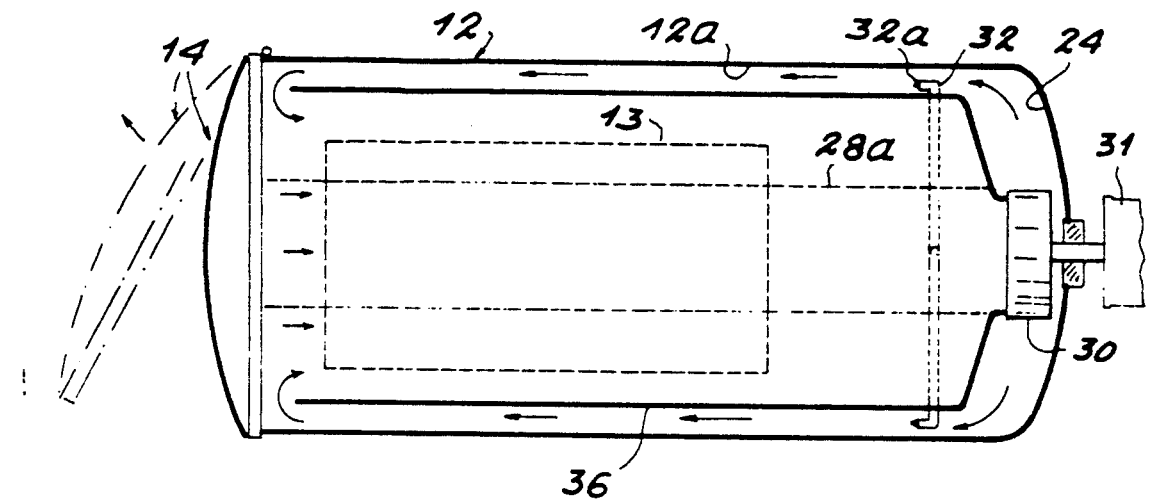
FIG. 2 is a schematic longitudinally cross-sectional view of the cooking vessel shown in FIG. 1.

Turning now to the drawings, more particularly to FIGS. 1 and 2, there is diagrammatically shown an apparatus for cooking foodstuffs. The apparatus mainly includes a boiler 11 acting as a steam generator and a sealed vessel 12 containing a basket 13 in which are placed the foodstuffs to be cooked. The basket 13 lies on an open-worked floor through which the condensation water may draw off so as to be stored beneath the floor. According to the invention, the vessel has a substantially cylindrical shape and is provided with a service door 14 formed into one of the end axial sides thereof. The water, previously charged in the steam generator 11, is made to boil by means of an electric resistor 11a. The latter is energized by means of an electric power source controlled by suitable means herein after described. The steam outlet 15 of steam generator 11 is connected to vessel 12 through a pipe 16 in which is mounted a valve 17 to be used for initially charging the steam into the vessel 12 and for controlling the steam supply as the cooking cycle is carried out.

The steam generator is provided with safety means such as an emergency valve 20a so adjusted as to be opened in case of excessive pressure within the vessel, and a vacuum breaker 21a shaped as a king of valve which, on the contrary, is so adjusted as to be opened in case of excessive low pressure in the vessel, thus avoiding damage to the vessel by implosion. An air relief cock 22a is also connected to outlet 15. The cock 22 is intended to drive out the air contained in the boiler when the latter is operated, the air being thus substituted for steam.

The relief cock is advantageously provided with a thermostatic device intended to cause the relief cock to be closed as soon as the heated steam escapes from the relief cock. The vessel 12 is provided with the same safety means which are identically arranged, i.e. a safety valve 20b, a vacuum breaker 21b and two air-relief cocks 22b and 23b to withdraw the air contained in the vessel when the apparatus is in operation. The whole constitutive members are connected to the upperportion of vessel 12 except the air relief cock 23b which is connected to the lower portion thereof. The inner space of the vessel 12 is further connected to a pressurestat 25 which emits an electric signal which is representative of the gauge pressure (more often a pressure lower than the atmospheric one, as previously stated) which prevails within the vessel. This electric signal monitors the control and regulation functions, as hereinafter stated. The vessel 12 is internally equipped with a condensation device shaped as a dispatching device 28 connected by means of an all or nothing valve 29 to a cold fluid source, which is in this case a cold water supplying device EF. The cold water is supplied in sheets onto the inner wall of vessel 12 and sprayed onto the inner wall of service door 14 and on the bottom inner wall which is axially opposite thereto. Said arrangement involves two effects:

it ensures that the steam is condensed and enables the gauge pressure within the vessel 12 to be raised to a selected set valve;

it enables the metallic body of vessel 12 to be cooled on purpose to avoid any energetic restitution which would disturb the temperature uniformity within the vessel.

In other words, the water trickling on the inner wall 12a of vessel 12 enables any temperature gradient in the vessel to be avoided.

The particular structure of the dispatching device 28 enables a sheet-shaped flow of water to be supplied onto the inner wall 12a of vessel 12. This dispatching device further comprises end nozzles, not shown in the drawings, intended to spray cold water onto the inner wall of service door 14 and that of the opposite bottom 24. The dispatching device 28 is located at the upper portion of the vessel and substantially extends along the longitudinal direction of almost the entire length of vessel 12. The dispatching device 28 comprises side openings 40 formed close to the inner wall 12a of vessel 12. These openings extend longitudinally along each side of the dispatching device. The inner space of the dispatching device 28 is connected to a cold water source and is thus filled with water. More precisely, the dispatching device 28 is defined between the upper part of the vessel inner wall 12a and a water retention sheet 28a which is longitudinally located and so shaped and mounted as to have its longitudinal edges extending close to internal wall 12a of vessel 12 on purpose to define the flow outlets of the cold water sheets. In other words, gauged longitudinal leak ports 40 are formed on each side of said the retention sheet plate. It has to be noted that the upper portion of vessel 12, which cannot be coated with a drawing down water sheet, is however, cooled by the water stored in the inner space of dispatching device 28.

The water is recovered in the lower portion of vessel 12 and is taken up by means of a liquid-ring pump 38. Use is made of the same condensation means during a first cooling phase to bulk products, upon cooking completion, so as to generate a gauge pressure much lower than the water surface tension in the products, that enables the water to be quickly evaporated from the products, and that results in a temperature decrease of the products.

During this time, the metallic body of the vessel is kept cooled by the trickling water as will be apparent hereinafter. This first cooling phase by water evaporation in contact with the products is followed by a cryogenic cooling phase. In the case of packaged products, the first cooling step is ensured by spraying water on the bag, whereupon the second cryogenic cooling phase is initiated.

Turning now to the cryogenic cooling means, vessel 12 contains a fan 30 which is driven from the outside by means of an electric motor 31. The fan 30 is axially mounted on the bottom central area 24. The fan 30 is part of the cryogenic cooling means which further comprises a liquified-gas tank, e.g. carbon dioxide, which is connected to the lower part of vessel 12 by means of a valve 35a, the opening of which enables gaseous carbon dioxide to be injected into vessel 12. The upper part of tank 34 is contacted to the vessel by a valve 35a. This gaseous carbon dioxide is relatively cold as it is generated by evaporating liquid carbon dioxide from the proper tank 34. Both valves 35 and 35a are connected to a curved diffusion pipe 32 provided with diffusion nozzles 32a which are regularly arranged along pipe 32. The latter is mounted into an elongated gap 33 provided between the inner wall 12a of vessel 12 and an inner shield 36 which is substantially cylindrical shaped. The shield 36 extends at an equal distance from the inner wall 12a within the whole vessel portion which is located above floor 18. The shield extends axially while becoming narrower up to the inlet of fan 30 so as to enable the gas to flow, in a longitudinal direction, between the inner space of shield 36 (which is the useful plenum of the cooking device) and the elongated gap 33. This flow stream is illustrated by the arrows show in FIG. 2. A controlled valve, not shown in the drawings, enables the gases heated during the cryogenic cooling phase to be released gradually, as the carbon dioxide is injected into the vessel.

The cold water distribution system EF is also connected to the boiler via a controlled valve 36 so as to reintroduce gradually the water, as required. Pump 38 is connected to a lower exit of vessel 12 via a controlled valve 41 for the purpose of drawing off the condensates as well as the uncondensable gases, especially that evolved by the "degasing" of bulk cooked products. This liquid-ring pump enables the mixture of condensate—uncondensable gases to be released. The delivery outlet of the pump is connected to a draining conduct V. Pump 38 is automatically operated so as to draw of the condensates and the uncondensable gases as well, either with respect to the set cycles or with respect to the prescribed temperature ranges.

The apparatus is completed by an electronic control unit 50 comprising a microcomputer. This unit comprises an input E for receiving the electric signal generated by pressurestat 25, control outputs S1 for monitoring the heating means and temperature control means and control outputs S2 for monitoring the cooling means.

More precisely, the outputs S1 are intended to monitor:

the electric intermittent power supply to heating resistor 11a;
the valve 17 monitoring the steam inflow into vessel 12;
the valve 29 enabling the steam condensation to be regulated by adjusting the cold water trickling in sheets onto the inner wall of vessel 12;
a valve 29a connecting the dispatching device to an air-compressed source AC which is bacteriostatic, and
the pump 38 for drawing off the condensate and the uncondensable gases.

Moreover, the outputs are intended to mainly monitor:

fan 30 and
valves 35 and 35a which regulate the cooled fluid flow stream within exchanger 32.

The man skilled in the art is aware of the design and adjustment of control unit 50. The apparatus of the invention may be operated as follows. First, resistor 11a is energized so as to produce steam at 100° C. The pressure generator 11 and vessel 12 are accordingly kept under atmospheric pressure and valve 17 is open. When air has been completely substituted for steam in steam generator 11, air-relief cock 22a is closed. Steam gradually fills vessel 12 while withdrawing the air through relief cocks 22b and 23b. Lower cock 23b is closed before cock 22b. Next, the valve 17 is actuated on purpose to control the steam flow stream from generator 11 to vessel 12. Resistor 11a is no longer energized but is intermittently energized when regulated by control unit 50. As the steam is condenses in vessel 12, mainly at the initiation phase, when the steam has contacted the cold foodstuffs, the steam latent heat is transfered to the foodstuffs, and, as a result, the temperature of the foodstuffs to be cooked increases. The heat transfer is made under depression at a temperature which is regulated with respect to a displayed set level which is monitored by the output signal generated by pressurstat 25. The inner vessel temperature, after a few minutes under operating conditions, attains the set value which correspond to a maximum temperature uniformity.

Figure 3:
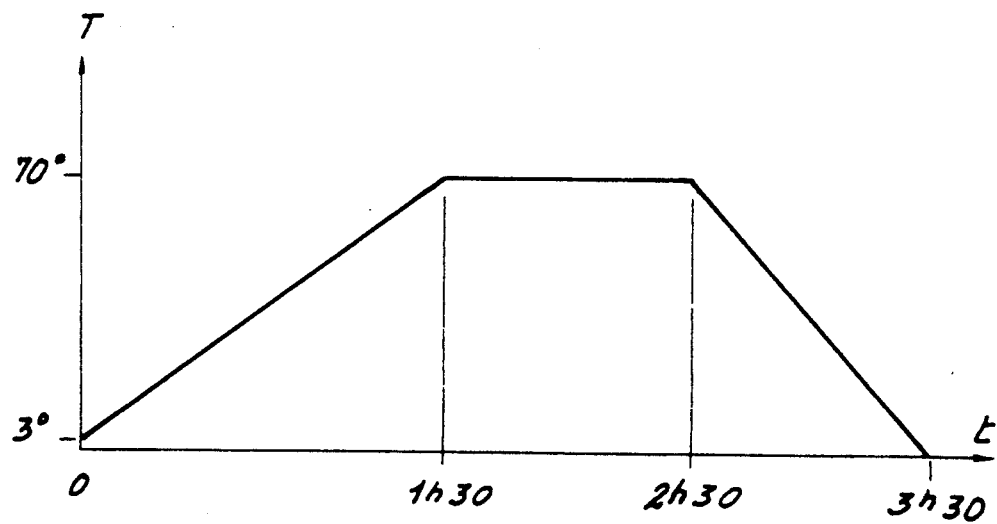
FIG. 3 is a diagram illustrating a cooking cycle selected for particular foodstuff, said cycle being so designed as to be automatically carried out by means of the apparatus shown in FIGS. 1 and 2.

By way of example, FIG. 3 illustrates a curve on which is plotted the temperature rise during a cooking-cooling cycle selected for the treatment of beef meat. The featuring parameters and periods of time plotted on the curve are programed and sent to control unit 50 at the beginning of the cycle. It appears that the temperature rises from $+3°$ C. to $70°$ C. in 1.5 hours, the graduation being substantially linear. The foodstuffs for 1 hour at $70°$ C. and are then cooled for one hour from $70°$ C. to $3°$ C.

During the whole rise in temperature and the cooking phase, the temperature is regulated by controlling the relative pressure, and particularly the depression prevailing in vessel 12. The control of the depression is mainly provided by the temperature regulation of liquid water when the latter is vaporized within the generator 11 (i.e. by means of the intermittent energizing of resistor 11a, which is controlled by means of a thermometer probe not shown in the drawings), by intake of additional steam into vessel 12 (by operating valve 17) and by the steam condensation rate in vessel 12 (through valve 29) regulated by the cold water drawing down along the inner wall in vessel 12. When wide depression adjustments or variations have to be carried out or corrected, the three parameters (especially the water heating and the water condensation) are mainly taken into account. Furthermore, the setting of the condensate level, by means of the intermittent operation of pump 38, enables the steam pressure to be more precisely controlled. In fact, when drawing off the condensate, the volume occupied by the steam in vessel 12 is very slightly increased, which would accordingly increases the depression. Thus these parameters have to be regulated especially during the cooking stage in order to control the cooking temperature to the nearest degree.

It has to be noted that cooking at medium temperature (about 70° C.) is not only advantageous with regard to dietetics, but also to energetics, since the "power" of steam-cooking is optimal below 100° C. and generally at about 70° C.

The frozen products may be subjected to a defreezing treatment before packaging or cooking. These products are disposed, when frozen, into vessel 12. The operation of pump 38 enables a vacuum lower than 4.6 mm Hg to be provided. Thus, the ice is converted into steam which is withdrawn by the same pump 38. The minimum temperature in vessel 12 is lower than +10° C.

At the beginning of the cooling step, the heating of the steam generator 11 is stopped and the temperature is then controlled by embodying two successive steps.

When bulk products have been cooked in bulk, use is made of watersheet condensation means which supply cold water to dispatching device 28. That results both in a steam condensation and a pronounced vacuum suction draught. This causes the products themselves to be subjected to cooling by the accelerated water evaporation due to the difference of surface tension of the product steam with respect to the gauge pressure in the vessel, as the temperature lowering is stabilized. This first cooling step by evaporation enables the liquid carbon dioxide consumption to be further reduced. Upon completion of the first cooling phase, the water trickling is stopped and the residual water is flushed off by means of sterile compressed air which is injected into the dispatching device via valve 29a connected to the compressed-air source AC. Then valve 35a is then is opened on purpose to inject the carbon dioxide in the vessel until the pressure within the vessel is slightly higher than atmospheric pressure. Valve 35 is then opened, which controls the liquified carbon dioxide intake and fan 30 is simultaneously actuated. The cooling operation is continued by controlled injection of carbon dioxide, via actuation of valves 35 and 35a.

To cool packed products, the vessel is merely filled with sterile compressed air in order to attain a pressure which is slightly higher than the atmospheric pressure. The inner wall of vessel 12 is cooled by means of water sheets. During the first cooling phase, the bags are merely sprayed with cold water and then the cryogenic cooling phase is carried out as previously described for the bulk products.

What we claim is:

1. An apparatus for steam cooking foodstuffs comprising:

means for producing steam including a steam outlet;

a sealed cylindrical vessel containing said foodstuffs, said sealed vessel receiving steam from said steam producing means via said steam outlet;

means for regulating pressure within said sealed vessel including means for condensing steam contained in said sealed vessel, said steam condensing means including means for generating a sheet-like flow of cold fluid which runs down an inner wall of said sealed vessel;

wherein said generating means further comprises a dispatching device for dispatching the sheet-like flow of cold fluid, said dispatching device disposed at an upper portion of said sealed vessel, said dispatching device including (1) a first part having first, second and third outer surfaces, said first part extending in the longitudinal direction of said sealed vessel, (2) lateral spaces defined between each of said first and second outer surfaces and said inner wall, said lateral spaces extending longitudinally on each side of said first part, and (3) an inner space defined between said third outer surface and said inner wall, said inner space receiving cold fluid from said cold fluid source;

wherein said first part is a sheet plate arranged to retain cold fluid at said upper portion of said vessel, said sheet plate having longitudinal edges extending proximate to said inner wall such that said lateral spaces are defined between said longitudinal edges and said inner wall.

2. An apparatus as recited in claim 1, wherein said sheet plate is convexly curved away from said inner wall.

3. An apparatus as recited in claim 1, wherein when a cold fluid retention capacity of said sheet plate is exceeded, cold fluid flows into said lateral spaces so that a sheet-like flow of cold fluid runs down said inner wall.

4. An apparatus for steam cooking foodstuffs comprising:

means for producing steam including a steam outlet;

a sealed vessel containing said foodstuffs, said sealed vessel receiving steam from said steam producing means via said steam outlet;

means for regulating pressure within said sealed vessel including means for condensing steam contained in said sealed vessel, said steam condensing means including means for generating a sheet-like flow of cold fluid which runs down an inner wall of said sealed vessel;

an inner shield having a defined inner space and being disposed in said sealed vessel, and a fan mounted to said inner shield;

means for cryogenically cooling said foodstuffs; and a controllable valve;

wherein said cryogenic cooling means includes a tank which is filled with a liquified gas and which is connected to said sealed vessel via said controllable valve, and a curved diffusion pipe which is mounted in an elongated gap defined between said inner wall and said inner shield, and wherein said fan forces said liquified gas to flow longitudinally in said inner space and said elongated gap.

* * * * *